United States Patent
Heimala et al.

(10) Patent No.: US 8,398,740 B2
(45) Date of Patent: Mar. 19, 2013

(54) METHOD FOR THE PRODUCTION OF METAL POWDER

(75) Inventors: Seppo Heimala, Pori (FI); Mikko Ruonala, Kirkkonummi (FI)

(73) Assignee: Outotec Oyj, Espoo (FI)

(*) Notice: Subject to any disclaimer, the term of this patent is extended or adjusted under 35 U.S.C. 154(b) by 623 days.

(21) Appl. No.: 12/377,225

(22) PCT Filed: Aug. 9, 2007

(86) PCT No.: PCT/FI2007/000200
§ 371 (c)(1),
(2), (4) Date: Feb. 11, 2009

(87) PCT Pub. No.: WO2008/017731
PCT Pub. Date: Feb. 14, 2008

(65) Prior Publication Data
US 2010/0180727 A1    Jul. 22, 2010

(30) Foreign Application Priority Data
Aug. 11, 2006  (FI) ..................... 20060726

(51) Int. Cl.
| | |
|---|---|
| B22F 1/00 | (2006.01) |
| B22F 9/00 | (2006.01) |
| C21B 15/04 | (2006.01) |
| C22B 5/20 | (2006.01) |
| C22C 1/04 | (2006.01) |

(52) U.S. Cl. ............. 75/347; 75/371; 75/373; 75/374; 75/364

(58) Field of Classification Search ............ 205/582; 75/347, 371, 373, 374, 364
See application file for complete search history.

(56) References Cited

U.S. PATENT DOCUMENTS

| | | | | |
|---|---|---|---|---|
| 2,285,762 | A | * | 6/1942 | Tuwiner et al. ............... 205/50 |
| 3,926,752 | A | * | 12/1975 | Loretto et al. ............... 205/582 |
| 4,141,804 | A | * | 2/1979 | Avedesian et al. ............ 205/348 |
| 4,421,616 | A | | 12/1983 | Bjune et al. |

(Continued)

FOREIGN PATENT DOCUMENTS

| | | |
|---|---|---|
| EP | 1 552 896 A1 | 7/2005 |
| GB | 2 226 331 A | 6/1990 |

(Continued)

OTHER PUBLICATIONS

International Search Report (PCT/ISA/210) dated Nov. 20, 2007.

(Continued)

*Primary Examiner* — Weiping Zhu
(74) *Attorney, Agent, or Firm* — Buchanan Ingersoll & Rooney PC

(57) ABSTRACT

The invention relates to a method for leaching a material containing a valuable metal and precipitating the valuable metal as a fine-grained powder by changing the electrochemical potential of an intermediary metal in the solution. In the leaching stage the intermediary metal or substance of the electrolyte solution is at a high degree of oxidation and in the precipitation stage another electrolyte solution is routed into the solution, in which the intermediary metal or substance is at a low degree of oxidation. After the precipitation stage the solution containing the intermediary is routed to electrolytic regeneration, in which part of the intermediary is oxidised in the anode space back to a high potential value and part is reduced in the cathode space to its low value.

28 Claims, 1 Drawing Sheet

U.S. PATENT DOCUMENTS

| | | | |
|---|---|---|---|
| 5,569,370 A * | 10/1996 | Gomez | 205/560 |
| 5,766,764 A * | 6/1998 | Olli et al. | 428/407 |
| 7,348,398 B2 * | 3/2008 | Goldacker et al. | 528/480 |
| 2005/0023151 A1 | 2/2005 | Sandoval et al. | |
| 2005/0067299 A1 | 3/2005 | Haiki et al. | |
| 2005/0217425 A1 | 10/2005 | Inazawa et al. | |
| 2006/0016684 A1 | 1/2006 | Marsden et al. | |
| 2006/0016689 A1 | 1/2006 | Carson et al. | |

FOREIGN PATENT DOCUMENTS

JP  2002-327289 A  11/2002

OTHER PUBLICATIONS

International Preliminary Report on Patentability (PCT/IPEA/409 dated Sep. 23, 2008.

* cited by examiner

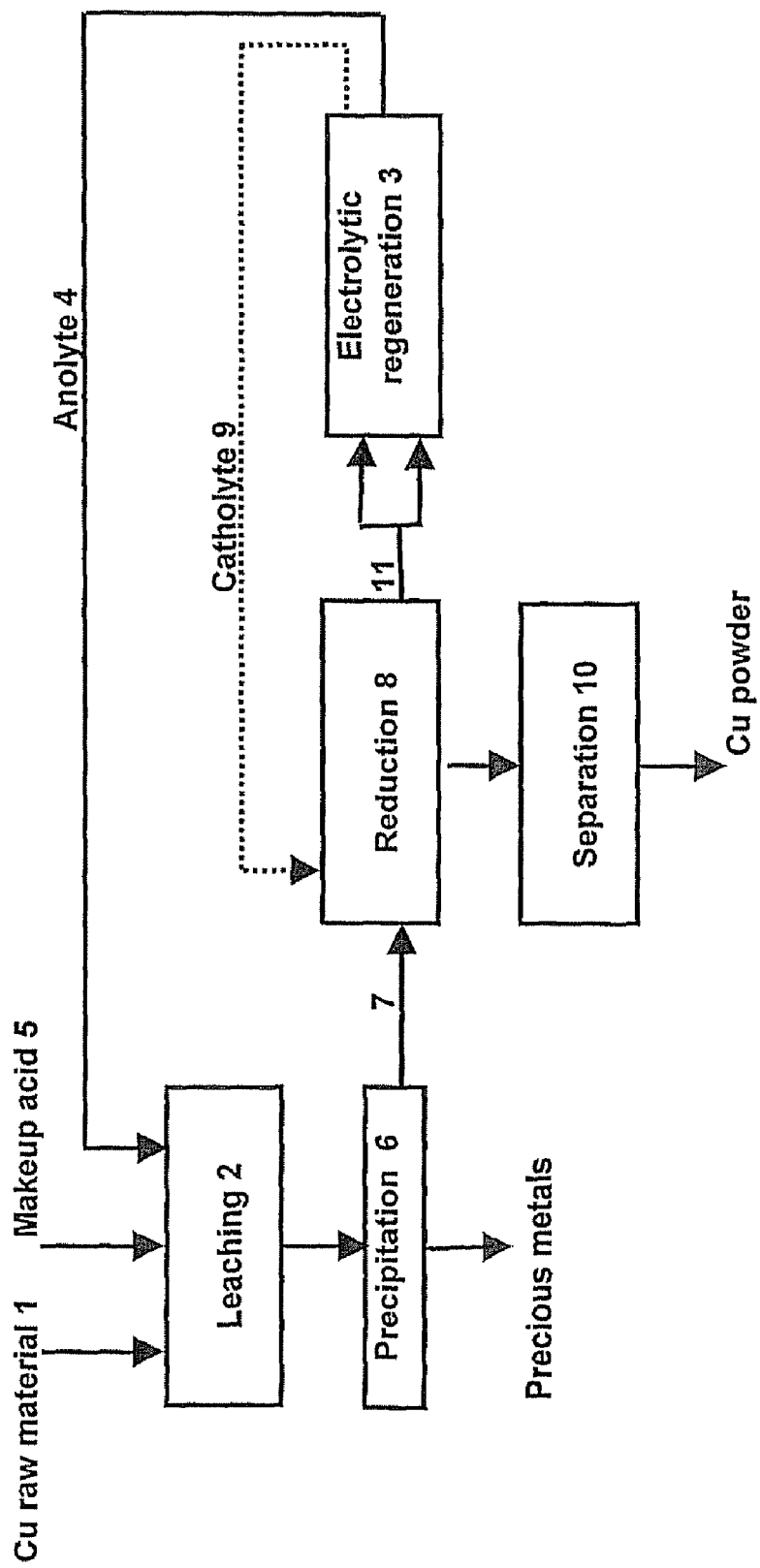

METHOD FOR THE PRODUCTION OF METAL POWDER

FIELD OF THE INVENTION

The invention relates to a method for leaching a material containing a valuable metal and precipitating the valuable metal as a fine powder by changing the electrochemical potential of an intermediary metal in the solution. In the method a raw material containing a valuable metal is leached and the valuable metal is precipitated by means of electrolyte solutions, which contains at least one intermediary metal or substance, the oxidation-reduction potential of which is exploited in the leaching and precipitation of the valuable metal. In the leaching stage the intermediary metal of the electrolyte solution is at a high degree of oxidation in order to leach the raw material. In order to precipitate the dissolved valuable metal another electrolyte solution is routed into the solution in the precipitation stage, where the intermediary metal or substance is at a low degree of oxidation. After the precipitation stage the solution containing the intermediary is routed to electrolytic regeneration, in which part of the intermediary metal is oxidised again in the anode space to a high potential value and part is reduced in the cathode space to a low value. The size and characteristics of the fine powder that is generated are controlled in particular by adjusting the precipitation conditions.

BACKGROUND OF THE INVENTION

The production of non-ferrous metals such as copper and nickel from concentrate occurs usually in the first stage pyrometallurgically. The processing of the copper matte formed in the first stage of treatment is generally continued further pyrometallurgically until the product is a cast copper anode, with a Cu content of 99.9%, which is routed to electrolytic refining to produce pure cathode copper. The fabrication of copper products starts with the smelting of a cathode, after which the molten copper can be cast in the desired shape and further processing depends on the goods to be produced. Further processing of the nickel matte generated in pyrometallurgical treatment is usually hydrometallurgical treatment. In this case nickel matte is ground, leached, solution purification is performed on the solution and finally the aqueous solution of nickel is routed to electrolytic recovery in order to form pure cathode nickel. Cobalt minerals often appear in the same ore as nickel minerals, particularly sulphides, and thus their production method is largely the same. The final product is often metallic cobalt in cathode form.

The final product of the metal production methods described above is a metal in cathode form. However, often some form other than a plate-like cathode would be more practical for the further processing of the metal.

An oxidation-reduction method for copper powder production is known in the prior art, for instance as described in JP patent application 2002327289, whereby an aqueous solution of sulphuric acid, which contains titanium, is routed to an electrolysis tank. The electrolysis anode is made of pure copper and there is a diaphragm between the anode and cathode. The electrolyte is routed from the cathode into the anode chamber whereupon the trivalent titanium of the cathode solution reduces the copper in the solution into metal powder, which precipitates in the anode chamber and is recovered from the solution.

US patent application 2005/0023151 (Phelps Dodge) describes a method for producing copper, in which exploitation of the ferrous/ferric anodic reaction is combined with conventional electrolytic copper recovery from a copper sulphate solution. According to the method, the solution entering electrolysis contains divalent iron in addition to divalent copper. In this case the cathodic reaction is the reduction of copper into metal and the anodic reaction is the oxidation of divalent iron to trivalent (ferrous/ferric). The ferric iron is regenerated by means of $SO_2$ into ferrous iron and routed back to electrolysis. Since sulphuric acid is formed in regeneration, it must be neutralised from the solution. In the method copper is produced as a conventional cathode, but a further development of the method is described in US patent application 2006/0016684, where a flow-through cell is used as the electrolysis cell and copper is produced as a powder. When, in addition to conventional electrolysis, the redox potential achieved from the different degrees of oxidation of iron is used in the methods, the energy consumption is lower than in conventional EW electrolysis. In addition, the formation of acid mist is less.

There are some weaknesses in the methods described above. A method described in the Japanese publication 2002327289, whereby pure copper is used to produce Cu powder, results in the traditional impractical factors, e.g. anode scrap problems, electrolysis contact problems and the fact that Cu powder has numerous generation points, causing sensitivity to quality defects and control difficulties.

The electrolytic recovery of copper by utilizing the ferrous/ferric reactions of the anode also gives rise to various problems: Despite the fact that the vast majority of the Cu powder comes off the cathode, at least a small part remains attached, whereupon the cathode section will become clogged causing serious process interruptions. On a slightly larger scale there are dozens or hundreds of powder generation points, which leads to costly investments and high operating costs (maintenance costs). It is hard to control the quality of the metal powder regarding grain size and morphology, and there are also difficulties in attaining uniform quality in different cells. The $SO_2$ used in the process is a problem and risk factor in work hygiene. In order for powder to be generated, a fairly high current density is required and this almost always leads to purity problems in metal powder. In addition, the separation of Cu powder from different cells is laborious.

PURPOSE OF THE INVENTION

The purpose of this invention is to eliminate the shortcomings of the methods described above and to introduce a method, which is simpler than before and which enables the production of a fine-grained powder.

SUMMARY OF THE INVENTION

The essential features of the invention will be made apparent in the attached claims.

The invention relates to a method for forming fine metal powder with a leaching-precipitation method on a valuable metal containing material. In the method accordant with the invention the material containing a valuable metal is leached and the valuable metal is precipitated out by means of electrolyte solutions, which contains at least one intermediary metal, and the different values of its or their electrochemical potential are utilised in the leaching and precipitation of the valuable metal.

The leaching and precipitation of the raw material is based on the fact that the solution used in leaching and precipitation contains one or more intermediary metals, the electrochemical potential of which is changed by means of electrolytic regeneration. The solution used in the leaching stage of the material containing a valuable metal is the anolyte routed from the electrolysis of an intermediary metal in which the intermediary is at a high oxidation degree, and the precipitation of the valuable metal is performed with the catholyte solution from electrolysis, in which the oxidation degree of the intermediary metal is lower than in the leaching stage.

After the precipitation stage the solution containing the intermediary metal is routed to electrolytic regeneration, in which part of the intermediary metal is re-oxidised in the anode space to a high potential value and part is reduced in the cathode space to a low value.

The powder generated in precipitation is separated from the solution by some known method. The grain size of the powder can be controlled by regulating the precipitation conditions. The method enables the formation of pure micro- and nanocrystalline powders.

LIST OF DRAWINGS

FIG. 1 presents a flow chart of one method accordant with the invention.

DETAILED DESCRIPTION OF THE INVENTION

Conventionally the recovery of a valuable metal as a metal is performed in electrolysis, where the valuable metal is precipitated on the cathode. In the method accordant with this invention the solution containing a valuable metal is not routed to electrolysis but instead the electrolyte solution containing one or more intermediary metals is processed in electrolysis i.e. in the electrolytic regeneration stage. The method could therefore be called indirect electrolysis. The leaching of the material containing a valuable metal is performed with the aid of the anolyte produced in electrolysis, in which the oxidation degree of the intermediary metal is high and thus it oxidises the valuable metal in the material. If the starting material containing a valuable metal is for instance a concentrate, air or oxygen may be used as oxidant in addition to the anolyte. The valuable metal dissolves as the soluble salt of the acid that is contained in the circulating electrolyte. The dissolved valuable metal is precipitated as a fine powder by means of the catholyte circulating from electrolysis, in which the oxidation degree of the intermediary metal is low and which thus reduces the valuable metal to metal.

The material containing a valuable metal to be fed to leaching is typically the product of a pyrometallurgical or hydrometallurgical process or scrap-like material, but concentrate for instance is also suitable as a leaching raw material. One suitable starting material for the method is the intermediate product produced by conversion e.g. $Me_xS$. The fabrication of an intermediate product by conversion is described e.g. in WO publication 2005 007905, 2005 007902 and 2005 007901. A significant portion of the impurities is removed during conversion and for instance precious metals have been enriched in the $Me_xS$. When the valuable metal is copper, the raw material may be Cu ore, Cu concentrate, a $Cu_xS$ product containing a precious metal produced by conversion, blister copper, Cu scrap etc. In the case of other metals, the raw material is required to be soluble in the anolyte. The direct and continuous measurement of the affecting electrochemical potentials and structures is crucial to the use of the method in the different stages of the process e.g. according to. U.S. Pat. No. 5,108,495.

According to the method, the metal to be precipitated is recovered in the desired particle size, which may vary from the millimetre range to the nanometre range.

Oxidation of the intermediary metal is carried out in an electrolysis cell, which is equipped with a diaphragm positioned between the anode and cathode. The electrolysis equipment required is fairly compact, because solids are not dissolved at the anode nor are solids precipitated at the cathode. In electrolysis, which is performed on the circulating solution that contains the intermediary, the cell voltage remains fairly low, because it is not the intention to produce oxygen, chlorine or another equivalent gas at the anode nor hydrogen at the cathode. The cell voltage is typically quite low, below 2.0 V, depending on the quality of the electrodes, the distance, the electrolyte, the current density, temperature etc. As an example of the use of a diaphragm it can be stated that it raises the cell voltage e.g. by around 50-100 mV in nickel electrolysis. The cell voltage remains low, because the space between the anode and cathode is small, as only circulating electrolyte flows in the cell, which forms oxidising anolyte and reducing catholyte as it is regenerated.

In this connection intermediary or intermediary metal means one or more metals, of which at least one of its oxidation degree in the leaching stage of the valuable metal-containing material is high in order to leach the valuable metal and at least one oxidation degree of the intermediary in the precipitation stage of the dissolved valuable metal is low in order to precipitate the valuable metal as a metallic powder. In some case the intermediary may also be a substance that possesses corresponding redox properties.

The electrolyte itself Le. the circulating solution used in leaching and precipitation, in principle can be any water-based, organic or molten salt electrolyte.

When the valuable metal is copper, nickel, cobalt or tin, the circulating solution is preferably either a sulphate- or chloride-based aqueous solution. The electrolyte can also be for instance a borofluoride or silicon fluoride electrolyte. Particularly when it is a question of the production of relatively base metals in powder form, some kind of electrolyte other than water-based is more practical. There is a sufficiently wide operating range in low-temperature molten salt electrolytes for anode and cathode reactions. The melting point of the molten salt is preferably between 0-800° C. Low-temperature ionic liquids can also be used in adapting the method.

When the desired solution containing a valuable metal is produced from the starting material by leaching it by means of the anolyte, it is subjected to cementation and, if necessary, some other solution purification. When the valuable metal powder formed is copper powder, metals sufficiently less noble than copper such as zinc, iron and manganese can be present in the circulating solution, but substances that are more noble than copper, substances that cement with copper are removed before copper powder precipitation. Substances to be removed are for example, gold, silver, selenium, and tellurium-, antimony- and bismuth-containing compounds. Solution purification is performed using either one or several conventional solution purification methods such as impurity cementation for instance using copper powder, ion exchange or liquid-liquid extraction. In addition, co-precipitation, adsorption processes and pre-electrolysis or crystallisation can be used. To keep the impurity level in the solution reasonable, some of the impurities can be removed by taking part of the electrolyte into a side stream, where a process of the prior art is carried out, such as small-scale electrolysis, e.g. to remove zinc, nickel, iron and cobalt. The side stream can typically be taken from the intermediary metal catholyte for example.

The electrolytically produced anolyte, which is used as the starting material for leaching, should be selected so that it leaches the desired valuable metal, but nevertheless does not significantly leach any impurities. In this way for instance the copper of the feed material dissolves, but in principle the impurities remain undissolved. At the same time in the precipitation stage the solution base of the catholyte and its intermediary metal should be selected on the basis of a suitable reduction power, so that only the desired valuable metal is reduced to metal. Thus the powder obtained as product can be separated in pure form.

One particularly advantageous application for the method is the production of copper powder. Other suitable valuable metals are nickel and cobalt for instance.

In the description of the method the example used is that of copper powder fabrication, but the invention is not restricted merely to copper.

The intermediary used for the leaching of the copper starting material and powder precipitation can be all suitable oxidation-reduction pairs, which enable the required leaching and precipitation. The kinds of intermediaries or redox pairs that can be used in aqueous solutions are for example vanadium, chrome and titanium singly or together, or together with some other redox pair such as iron. In addition to these, for example, manganese, cobalt, zinc, samarium, europium, ytterbium, uranium, alkali and alkali earth metals can be used as intermediaries, either singly or together. The increase in the oxidation degree of the one or more intermediaries in the solution in electrolysis succeeds when a suitable diaphragm is used between the anode and cathode.

The intermediary metals formed in electrolysis that oxidise copper material are utilised in the leaching of a copper-bearing material. Thus the intermediary in an anolyte solution is typically at least one of the following: $V^{4+}$, $V^{5+}$, $Fe^{3+}$, $Cr^{4+}$, $Cr^{5+}$, $Cr^{6+}$, $Mn^{3+}$, $Mn^{4+}$, $Mn^{6+}$ and $Mn^{7+}$. In precipitation of the dissolved copper the copper-reducing intermediary metals formed at the cathode are utilised, whereby there is at least one of the following in the catholyte solution: $V^{2+}$, $Cr^{0}$ and $Ti^{3+}$. The metal acting as intermediary may be active only in either the anolyte or catholyte or in both.

Aspects relating to the density and immutability of the diaphragm are crucial for the functioning of the process. Ready-made diaphragm solutions are known in the prior art, in which the diaphragm is mostly a mechanical insulator or it may possess ion-selective properties of varying degrees. The numerous diaphragm-sealing methods offered by the process solution can also be utilised in the method, so that the process solution may contain Ti-, Si-, C-, Sb-, or Sn-bearing compounds. At its simplest the diaphragm may be for instance the terylene cloth used in nickel and cobalt electrolysis cells, which has proved practicable.

In the tests performed it was found that the leaching power of the anolyte and the dissolution kinetics of the copper material depend on the composition of the anolyte, both its acid concentration and the trace element content of the solution such as for example the oxygen, chloride and antimony concentrations. It is advantageous for the method that the process stages are monitored and guided by means of electrochemical methods based on the use of mineral electrodes, which are described e.g. in U.S. Pat. No. 5,108,495. Electrochemical methods include preferably concentration measurements, solution- and material-specific redox levels and surface structures as specified by means of impedance spectroscopy (EIS) of phase-sensitive AC methods.

The size and quality of metal powder can be affected by using seed nuclei and/or additives in precipitation. A method is described above for the production of a pure metal powder, whereby the same powder is recirculated as a seed nucleus. However, if it is desired to produce a powder including other materials, this can be achieved by using the material concerned as the precipitation nucleus. Thus carbides, oxides, nitrides, borides, plastics or other materials can be fed into the precipitation stage, upon which the metal powder will precipitate. Another alternative is to surface-treat the product powder that is generated. In particular, when the copper or other easily oxidizable substance are concerned, one must remember, however, that after the precipitation stage, processing should take place in an oxygen-free or non-oxygen releasing environment in order to prevent the oxidation of the powder.

The method is described in the principle chart of FIG. 1 in connection with the production of copper powder. The raw material for the production of fine copper powder can be for instance anode copper, blister copper, copper scrap, copper sulphides, either copper concentrates or also partially copper oxides. If the main purpose is to obtain a fine powder from solid copper by means of the method, the starting material may also be cathode copper.

A copper-bearing material 1 is routed typically in granular form to the leaching stage 2, which is carried out for example as sulphate-based leaching by means of the anolyte 4 exiting electrolytic regeneration 3. Leaching can also be chloride-based. The anolyte includes the metal chosen as intermediary in its high oxidation degree, so that the copper dissolves. Anolyte containing vanadium and possibly iron can be advantageously used as the oxidising intermediary. The vanadium contained in the anolyte is in this case in oxidation degree $V^{5+}$ and/or $V^{4+}$ and it is reduced in the reactions to the value $V^{3+}$. Makeup acid 5 can be fed into the leaching stage to regulate the conditions. Leaching is performed in one or several stages and the stage comprises one or more stirred reactors. For the sake of simplicity only one stage is shown in the figure. The conditions are regulated to be such that metals and metal compounds nobler than copper do not dissolve, so they form a sediment that is separated out of the solution in the final precipitation stage 6. The leaching of precious metals is also possible, so they are removed selectively from the solution. The solution can further be subjected to ordinary solution purification to remove for instance dissolved nickel, cobalt and zinc (not shown in detail).

The copper sulphate solution 7 purified from precious metals is routed to the reduction stage 8, where reduction is carried out by means of the catholyte 9 routed into the solution. The catholyte includes the metal selected as intermediary in its low oxidation degree, so that it precipitates the reduced copper as metallic powder. The vanadium contained in the catholyte is at oxidation degree $V^{2+}$ and it oxidises to a value of $V^{3+}$. Precipitation is also performed in one or several stages, in one or several stirred reactors, and the powder precipitated in their lower section is removed.

The powder is routed to a separation process 10, where it is treated in an inert environment or shielding gas, whereby the oxidation of the powder is prevented. The form of the separation process depends on the particle size of the powder produced. With powder of coarser particle size the separation can take place mechanically using at least one of the separation methods: filtration, centrifugation, screening or magnetic separation. When nano-class powder is concerned, extraction with a poorly soluble organic solution of electrolyte or the use of a centrifuge is more cost-efficient than filtration. The extraction solution is separated from the powder by evaporation. The use of a centrifuge for powder separation and post-treatment such as washing is advantageous in that it is easy to combine it with cathodic protection and purification treatment.

The particle size and form of the powder to be precipitated can be regulated by adjusting the process variables such as concentration, temperature, redox levels and mixing conditions. In addition, nucleation and additives can be used.

The electrolyte solution 11 exiting the precipitation stage, in which the vanadium acting as intermediary is at the value of $V^{3+}$, and which consists of both the anolyte fed into the leaching stage and the catholyte fed to precipitation, is routed to electrolytic regeneration 3, some into the anode space and some into the cathode space. During regeneration some of the trivalent vanadium in the solution is oxidised at the anode to four and/or five valent and some is reduced at the cathode to divalent. It is very important in electrolytic regeneration that the current efficiencies of the anode and cathode reactions are in balance. In practice this means that the oxidation level and/or the oxidation power of the anolyte can if necessary be raised by feeding oxygen-containing gas into the system, and the reduction power of the catholyte can be increased by performing an additional reduction in connection with solution purification or separately. As stated above, the electrolyte solution may also include several intermediary metals, which either function as oxidisers or reducers or are active only in the other stage of the method.

The balance of the cathode current efficiency means that a sufficient amount of reducing ions is generated at the cathode. The anode current efficiency affects the cell voltage mostly, not so much the raw material leaching possibilities, since, in addition to anode products, air or oxygen etc. can also be exploited in leaching in cases where substances other than valuable substances should be oxidised from the source material. This kind of case is relevant when the raw material is for example a concentrate, such as Cu $FeS_2$ concentrate or (Ni, Fe,Co)$_9S_8$ concentrate.

EXAMPLES

Example 1

The source material used in the tests carried out was granulated raw copper fabricated by the direct to blister method, and the analysis of the blend components was as follows:

Ni 1120 ppm
As 1030 ppm
Bi 115 ppm
Sb 195 ppm
Pb 282 ppm
Ag 314 ppm
Au 35 ppm
Se 278 ppm
Te 94 ppm
Pt 2.1 ppm
Pd 3.4 ppm
S 0.89%
Fe 0.05%
Zn 0.15%

Cu blister granule and Cu scrap (in a ratio of 82:18) was leached at a temperature of 85° C. in two stages into a sulphate-based anolyte. The anolyte was the circulation solution from the anode space of intermediary metal electrolysis, in which there was 150 g/l $H_2SO_4$, 15 g/l $V^{4+}$ and 10 g/l $V^{5+}$, 3.2 g/l $Ni^{2+}$, 1.7 g/l $Fe^{3+}$ and 1.1 g/l $Zn^{2+}$. The elements nobler than copper were cemented out from the solution obtained to a level below 1 mg/l by electrochemical control using copper powder and other known reagents. As, Sb, Bi and Sn were also co-precipitated with known methods to concentrations below 1 mg/l. Cu powder was precipitated from the obtained solution of $Cu^{2+}V^{3+}Fe^{2+}Ni^{2+}Zn^{2+}$ and $H_2SO_4$ with a catholyte i.e. $V^{2+}$-sulphate solution. Fine copper powder was used as a nucleus in precipitation, so that as a result essentially spherical copper powder with a grain size of 0.8-1.5 μm was obtained. The reduction redox level was −460--410 mV, Cu vs. AgCl/Ag.

The copper powder obtained was separated with a centrifuge and some of the fine copper powder was returned as a precipitation nucleus. The actual product was washed with cathodic protection in a shielding gas using a centrifuge. With regard to purity, the dried, completely oxygen-free copper powder product was of the type of cathode product generated in conventional electrolytic purification. The copper powder product has super-plastic properties and therefore it can be directly used for forming.

After Cu powder separation, the Cu-free solution was routed to electrolytic regeneration in an electrolysis cell equipped with a diaphragm, at an operating temperature of 60° C. In the anode space $V^{3+}$ was oxidised to $V^{4+}$ and $V^{5+}$ and in the cathode space $V^{3+}$ was reduced to $V^{2+}$ when the cell voltage was at a value of 1.85 V and the current density at a value of 750 A/m². The anode sludge generated in granule leaching was essentially the same kind as in conventional refining electrolysis and it was processed into products in the conventional manner.

Example 2

In the test performed the source material was a $Cu_xS$ concentrate containing precious metals (x~1.85) originating from leaching and flotation and produced by conversion with a Cu content of 68.4%. The other components in the $Cu_xS$ concentrate were silicates $SiO_2$ 3.7%, the remainder being $FeS_2$ and other typical copper concentrate minerals.

The $Cu_xS$ concentrate was leached at a temperature of about 95° C. into an anolyte, which was a $Fe^{3+}$—$Cr^{3+}$—$NH_4^+$ sulphate solution. The $Fe^{2+}$—$Cu^{2+}$—$Cr^{3+}$ solution formed in leaching, with a pH in the range of 1.6-2.0, was purified in the same way as in example 1 using cementation and co-precipitation.

The valuable substances from the leaching residue and cementation were recovered by known methods. The $Cu^{2+}$ solution, purified from substances nobler than copper and from the substances that were attempted to reduce along with the copper, was routed together with the catholyte to be fed from electrolysis, whereupon the $Cu^{2+}$ was reduced in the presence of the nucleus. The reduction of copper occurred as a result of the reaction $Cu^{2+}+2Cr^{2+}\rightarrow Cu+Cr^{3+}$ into metal powder and it was separated from the electrolyte as in example 1.

After precipitation the electrolyte was regenerated in electrolysis into an $Fe^{3+}$—$Cr^{3+}$—$NH_4^+$-sulphate solution containing $H_2SO_4$ (anolyte) and a catholyte containing $Cr^{2+}$ at a temperature of 55° C. In regeneration, the pH of the intermediary solution was in the range of 2.25-2.5, the cell voltage 2.5 V and the $Cr^{3+}+e^-=Cr^{2+}$ current yield 92.5%. The anolyte was routed to the electrochemically controlled leaching of the $Cu_xS$ raw material containing a noble metal and the catholyte was routed to the copper precipitation of the electrochemically controlled and purified Cu electrolyte.

Example 3

One example of the raw material used in the test was a Cu concentrate, analysed as follows:
Cu 27.5%
Fe 28.4%
S 33.4%
Zn 11.0%
Ni 0.04%

Co 0.01%
Pb 0.08%
As 0.07%
Sb 0.01%
Bi 0.025%
$SiO_2$ 3.7%
Au 9.5 ppm

The copper in the concentrate was mainly present as $CuFeS_2$.

An iron-chrome-alkali-earth alkali-halide solution was selected as circulation electrolyte, in which the intermediary metal acting as oxidant was $Fe^{3+}$ regenerated in the electrolysis anode section and the intermediary metal used to act as reductant was $Cr^{2+}$, which was formed electrolytically at the cathode. Leaching of copper concentrate occurred countercurrently at a temperature of 95-105° C. in atmospheric conditions. The retention time of the solids was 10.5 hours and the leaching yield for copper was 99.3% and for gold 87.8%. Since the anode product $Fe^{3+}$ was not sufficient to oxidise the whole of the Cu concentrate, oxygen gas was used in leaching as an aid utilising the $Cu^{2+}/Cu^+$ redox pair. The final part of leaching was a reduction stage $Cu^{2+}+Me_xS \rightarrow Cu^+$, which took place primarily by means of the $CuFeS_2$ mineral and about 10% was carried out with $Cu_xS$ produced by conversion. Since the electrolyte was a strong halide solution, the $Cu^+$ solubility was known to be high. Solution purification from impurities that precipitated out with the copper powder was performed by raising the pH slightly, by cementation, co-precipitation and a short pre-electrolysis (<0.2% Cu equivalent).

After solution purification, copper reduction to metallic copper powder was performed by means of $Cr^{2+}$. The copper powder produced was purer than ordinary copper cathode. After-treatment of the powder occurred in the same way as in example 1.

The regeneration of the electrolyte by electrolysis, producing $Fe^{3+}$ and $Cr^{2+}$ was carried out at a cell voltage of 1.34 V.

The invention claimed is:

1. A method for the formation of fine valuable metal powder by leaching-precipitation of a material containing a valuable metal, comprising:
   leaching the material containing a valuable metal by means of an electrolyte solution, which contains one or more intermediary metals, wherein the electrolyte solution is an anolyte routed from an electrolytic regeneration wherein said anolyte contains said one or more intermediary metals at a high oxidation degree, to form a solution comprising the valuable metal; and
   precipitating the valuable metal as metallic powder using an electrolyte solution which contains said one or more intermediary metals, wherein the electrolyte solution is a catholyte solution from the same electrolytic regeneration, wherein the oxidation degree of said one or more intermediary metals is lower than in the leaching step, to form a precipitated valuable metal powder;
   wherein a solution containing a valuable metal is not routed to electrolysis.

2. The method according to claim 1, further comprising, after the precipitating, routing a solution containing said one or more intermediary metals to an electrolytic regeneration comprising an anode space comprising an anode and a cathode space comprising a cathode, and oxidising one part of the solution containing an intermediary metal or metals in the anode space to a high potential value, and reducing the other part of the solution containing an intermediary metal or metalsin the cathode space to a low potential value.

3. The method according to claim 2, wherein a diaphragm is used in electrolytic regeneration between the anode and cathode.

4. The method according to claim 1, further comprising purifying the solution comprising a valuable metal before the precipitating by cementing the metals nobler than the valuable metals and performing solution purification.

5. The method according to claim 1, wherein the valuable metal is copper.

6. The method according to claim 1, wherein the valuable metal is one of nickel, cobalt or tin.

7. The method according to claim 1, wherein the intermediary metal is one of the following: vanadium, titanium, chrome, or iron.

8. The method according to claim 1, wherein the intermediary metal is one or more of the following: manganese, cobalt, zinc, samarium, europium, ytterbium, uranium, an alkali- or alkaline earth metal.

9. The method according to claim 1, wherein in a solution containing several intermediary metals one intermediary is active in the anolyte and another intermediary metal is active in the catholyte.

10. The method according to claim 1, wherein the material containing a valuable metal is a product of a pyrometallurgical process.

11. The method according to claim 1, wherein the valuable metal containing material is a product of a enrichment technique or hydrometallurgical process or an intermediary product made by conversion.

12. The method according to claim 1, wherein the valuable metal containing material is scrap-type.

13. The method according to claim 1, wherein the valuable metal dissolves as a soluble salt of the acid contained in the electrolyte solution.

14. The method according to claim 1, wherein the electrolyte solution is a sulphate- or chloride-based aqueous solution.

15. The method according to claim 1, wherein the electrolyte solution is a molten salt solution, the melting point of which is 0-800° C. or an ion-liquid or an organic electrolyte.

16. The method according to claim 1, wherein nuclei are used in the precipitation of the valuable metal.

17. The method according to claim 16, wherein the nuclei are the metallic powder of the valuable metal.

18. The method according to claim 16, wherein the nuclei are at least one of the following group: carbides, oxides, nitrides, borides, plastics or some other organic material, onto which the valuable metal powder is precipitated.

19. The method according to claim 1, wherein a coating is formed on top of the valuable metal powder.

20. The method according to claim 1, further comprising separating the precipitated valuable metal powder from the electrolyte solution to form a separated precipitated valuable metal powder, processing the separated precipitated valuable metal powder in an oxygen-free or a non-oxygen releasing environment, and washing the separated precipitated valuable metal powder with cathodic protection in a shielding gas.

21. The method according to claim 1, further comprising mechanically separating the fine valuable metal powder from the electrolyte solution using at least one of the following methods: filtration, centrifugation, screening or magnetic separation.

22. The method according to claim 1, further comprising separating the fine valuable metal powder from the electrolyte solution by extracting with an extraction solution that is poorly soluble to the electrolyte, and removing the extraction solution from the powder by evaporation.

23. The method according to claim 1, further comprising controlling the method by electrochemical measurement and control methods.

24. The method according to claim 2, wherein the valuable metal is copper.

25. The method according to claim 2, wherein the valuable metal is one of nickel, cobalt or tin.

26. The method according to claim 2, wherein the intermediary metal is one of the following: vanadium, titanium, chrome, or iron.

27. The method according to claim 2, wherein the intermediary metal is one or more of the following: manganese, cobalt, zinc, samarium, europium, ytterbium, uranium, an alkali- or alkaline earth metal.

28. The method according to claim 2, wherein in a solution containing several intermediary metals one intermediary is active in the anolyte and another intermediary metal is active in the catholyte.

* * * * *